Sept. 2, 1952 L. THURM 2,609,457

ELECTROMAGNETIC SOUND RECORDER AND REPRODUCER

Filed March 16, 1949 4 Sheets-Sheet 1

Inventor
Léon Thurm
By Linton + Linton
Attorneys

ELECTROMAGNETIC SOUND RECORDER AND REPRODUCER

Filed March 16, 1949 4 Sheets-Sheet 2

Inventor
Léon Thurm
By Linton & Linton
Attorneys

ELECTROMAGNETIC SOUND RECORDER AND REPRODUCER

Filed March 16, 1949 4 Sheets-Sheet 3

Inventor
Léon Thurm
By Linton & Linton
Attorneys

ELECTROMAGNETIC SOUND RECORDER AND REPRODUCER

Filed March 16, 1949

Inventor
Léon Thurm
By Linton + Linton
Attorneys

Patented Sept. 2, 1952 2,609,457

UNITED STATES PATENT OFFICE 2,609,457

ELECTROMAGNETIC SOUND RECORDER AND REPRODUCER

Léon Thurm, Mondorf-les-Bains, Luxemburg

Application March 16, 1949, Serial No. 125,493

2 Claims. (Cl. 179—100.2)

The present invention relates to electromagnetic sound recording and reproducing devices and, more particularly, such devices of small and compact form capable of employing a magnetic tape.

The main object of the invention is the provision of a device whereby a relatively large number of sound or voice recordings, or tracks can be separately accommodated on one tape and selectively reproduced therefrom.

Another object contemplates a compact portable device of the character described wherein the tape-translating means are of the simplest inertia type.

A further object is the provision of a simple, small recording and reproducing device in which a plurality of tape bobbins or reels carrying, or adapted to carry sound tracks, are selectively coupled to the single inertia driving means and electrically switchable to the electromagnetic recording or reproducing devices.

Figures 1, 2:
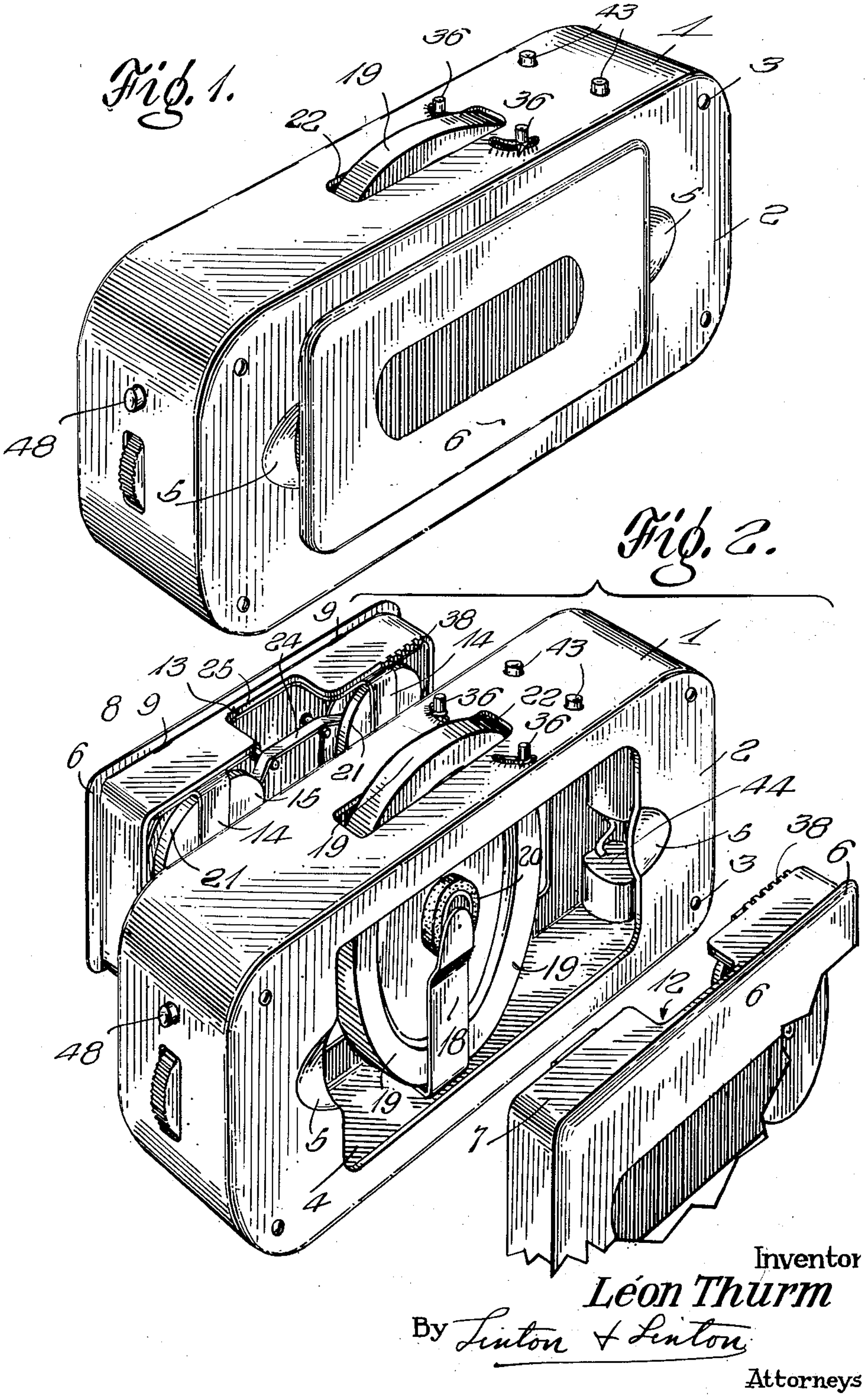
Fig. 1 is a perspective view of the device.
Fig. 2 is a disassembled perspective view of same with the reel casings removed.

The device is housed within a casing comprising preferably a continuous strip 1 forming the top, bottom and end walls thereof. The side walls of the casing are each formed from a plate 2 secured to the strip 1 by means of the screws 3. Each side plate has formed therein a rectangular opening 4 and finger depressions 5. The reel casings each comprise a flanged plate 6 having formed with and extending horizontally from one face thereof a strip consisting of a lower section 7 and an upper section 8. The strip forming the sections 7 and 8 of a reel casing extend through an opening 4 whereby the flanged portions of the plates 6 rest upon the outer faces of the side plates 2 of the casing and extend entirely over the openings 4 therein. The sections 7 and 8 are of a length less than that of an opening 4 whereby the entire reel casing may be manually shifted longitudinally back and forth within an opening 4 of the casings. Spring clips 9 are attached to the reel casings for retaining the latter within the openings of the plates 2 and yet permit of this free longitudinal sliding movement. Insertable within each reel casing is a reel supporting frame 10 consisting of a lower plate and an upper plate 11 and the latter is provided with a cut-away portion 12 adapted to register with a corresponding cut-away portion 13 of the upper section 8 of the reel casing. The upper and lower plates of the frame 10 are connected by means of the bars 14. The removable tape bobbins or reels 15 are provided with stub shafts 16 journalled within bearings formed in the bars 14 and bearings 17 formed with the inner faces of the plates 6 of the reel casings.

Supported within the casing of the device is a bearing bracket 18 having rotatably mounted therein, a driving wheel 19. This heavy driving member or wheel 19 has opposite friction discs 20 engageable at times with the discs or flanges 21 of the reels for driving the latter. A portion of the periphery of this wheel 19 extends through an opening 22 formed in the top wall of the casing of the device whereby when the wheel 19 is rapidly rotated by manually contacting the so-extended portion thereof, either reel 15 of one set may be caused to rotate therewith at the will of the operator.

A set or pair of reels 15 is mounted within each removable and shiftable reel casing and a single magnetic tape 23 is capable of being wound upon or unwound from each set of reels. A section 24 of each tape is trained over the pins 25 extending from the plates 6 of the reel casings so as to provide a straight portion immediately below the recording heads 26.

Secured to and suspended from the lower face of the top wall of the casing is a bracket 27 having pivotally connected thereto, as as 28, a pair of sectors 29 provided with gear teeth 30. Pivotally connected, as at 31, to each sector 29 is a head supporting bar 32 arranged parallel to the tape axis and each bar 32 is supported and guided by the depending brackets 33. Links 34 pivotally connect the bars 32 to the bracket 27.

According to one feature of the invention the heads 26 are movable transversely across the tape in definite parallel step constituting independent tracks 35. This transverse motion is effectuated by the parallel arrangement of the links 34 displacing the head-carrying bars 32 parallel to the tape axis. This latter is effected by the pins 36 extending through and above the casing of the device and each pin carrying a pointer displaceable respectively to the scale markings upon the top wall of the casing. By manually moving these pins 36 the heads 26 may be shifted across the tape to the desired track thereupon. At the beginning of each recording or reproducing a head 26 is so moved where it may engage the desired track upon the tape or either head 26 may be moved out of contact with the tape when not in use. The tracks extend from one end of the tape to the other and start and end at both ends of the tape in oppositely alternating sequence.

Rotatably mounted upon the bracket 27 is a pair of tooth cup pinions 37 adapted to mesh with the racks 38 formed with the upper section 8 of the reel casings whereby when the latter are reciprocated a rotatable movement will be transmitted to the pinions 37. A flexible pawl 39 carried by a pivotally supported bracket 40 has one end capable of riding upon the cam 41 of a pinion 37 and the opposite end thereof being engageable with the teeth of a pinion 42 which latter are in mesh with the teeth 30 of the sectors 29. As each reel casing is manually shifted the cup-shaped pinions 37 will also rotate whereupon the cams 41 will move the pawls 39 causing the pinion 42 to be moved a distance of one tooth. A sector 29 will also be moved therewith whereby the head 26 connected thereto may be shifted or moved to the next adjacent track 35 upon the tape and in this manner continuous recordings or reproductions may be made until all of the tracks upon the tape are scanned.

Figure 7:
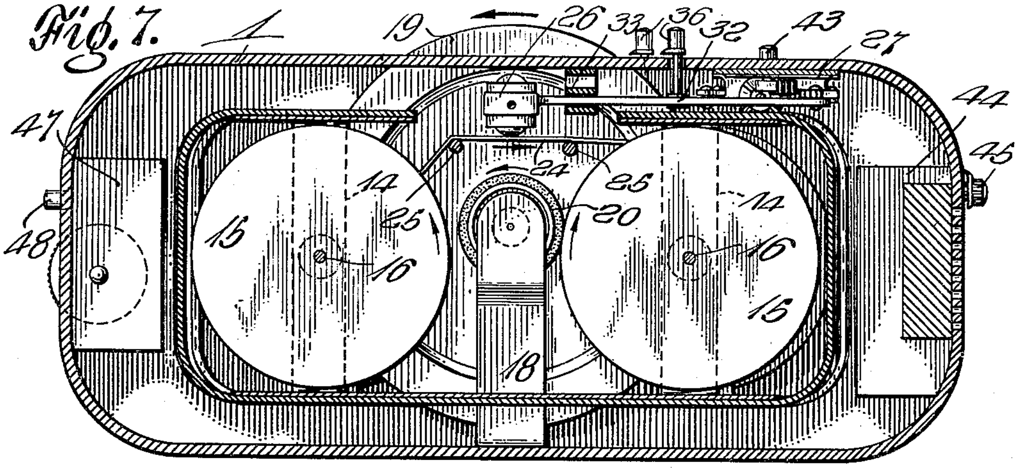
Fig. 7 is a longitudinal vertical section taken through the device.
Figures 8, 9, 10:
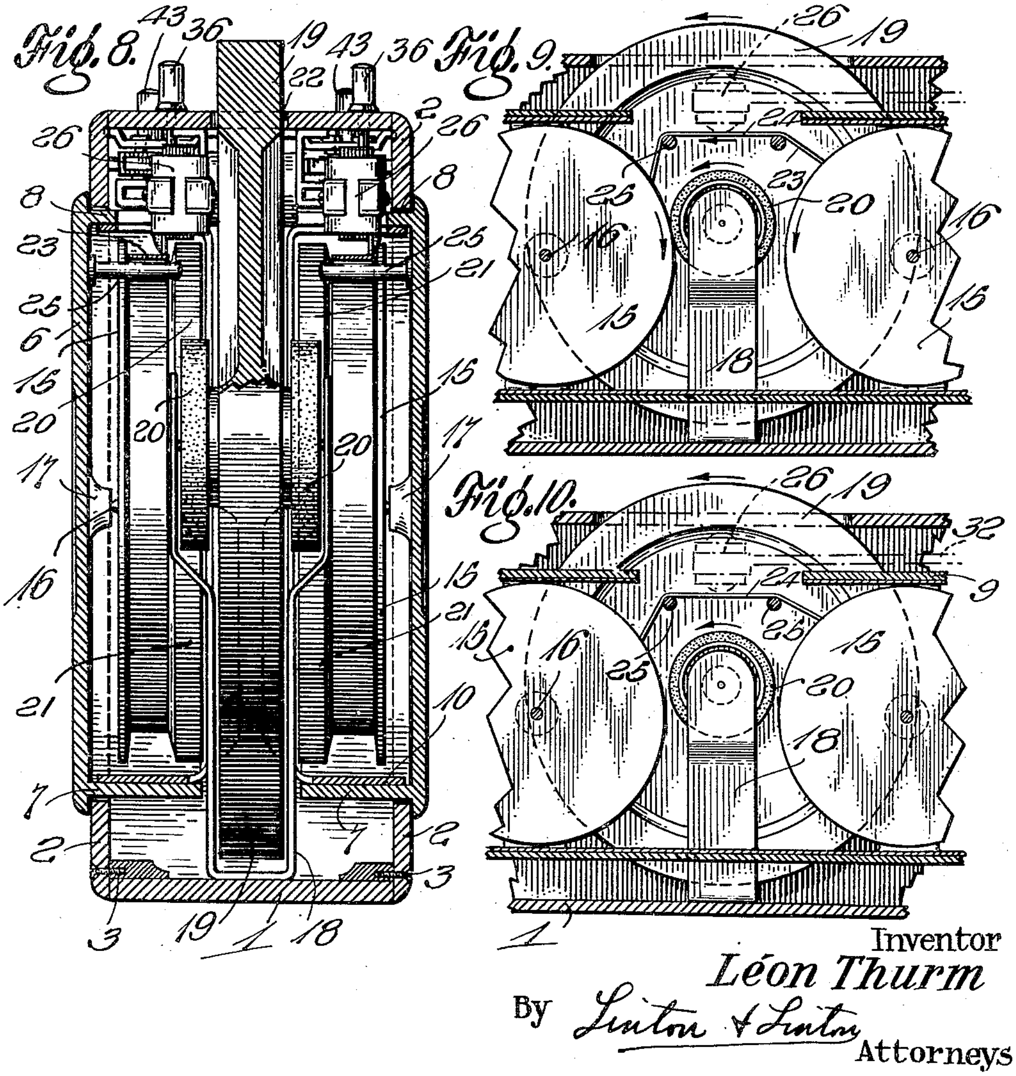
Fig. 8 is a vertical transverse section of same.
Fig. 9 is a detail view showing the clutching means between the driver wheel and the reels.
Fig. 10 is a similar view showing both reels in inoperative position.
Figures 11, 12, 13, 14, 15:
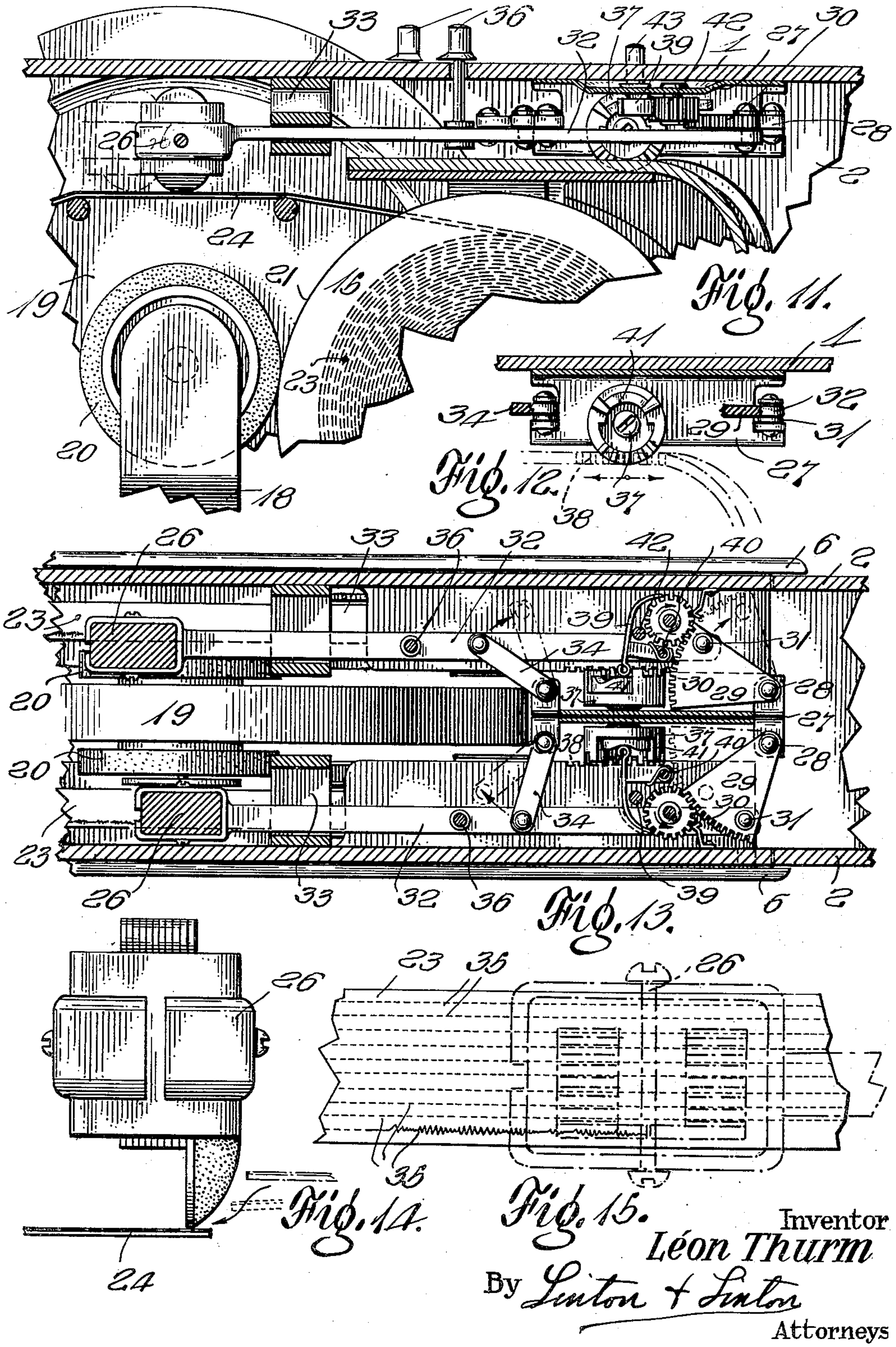
Fig. 11 is an enlarged fractional view through the upper center of the device, showing the means for laterally shifting the recording head across the tape.
Fig. 12 is an enlarged fractional plan view of the same means and also the means for clutching the reels on and off the driving wheel.
Fig. 13 is a detail elevation of the reel casing shifting gear and cam.
Fig. 14 is a side elevation of the recording head.
Fig. 15 is a plan diagrammatic representation of a magnetic tape on which the position of the sound tracks are fancifully shown in relation to the recording head illustrated by means of dotted lines.

From the above it will be understood that an operator when using the device may, through the manipulation of a knob 36, move one head 26 to a position or that as shown in the lower part of Figure 13 so as to register with the lowermost or starting track 35 of the tape and the other head 26 moved to an inoperative position or that as is shown in the upper part of Figure 13 where this latter head 26 is out of contact with the tape 23. By manually rotating the heavy wheel 19 sufficient inertia will be set up as to cause this wheel 19 to continue to rotate for a relatively long period of time. As the wheel 19 rotates in the direction of the arrow, as shown in Figure 7, the operator by grasping the plate 6 of the reeling casing at the right hand side of the device as shown in Figure 8 will shift this entire reel casing until a reel 15 frictionally contacts with a disc 20 carried with the wheel 19 causing the reel to travel in the direction of the arrow whereupon the tape 23 will move in a direction of the arrow as shown in Figure 7. The recording or reproducing of the sound waves to and from the track 35 so engaged by the head 26 will continue for the full length of the tape as it is wound upon the reels 15. As the first track upon the tape comes to an end this reel casing is shifted in an opposite direction until the reel 15 engages disc 20 as is shown in Figure 9 whereupon the tape will be caused to travel in an opposite direction or that shown by the arrow. As this reel casing is so shifted the cup-shaped gear 37 will be rotated and the cam thereof will cause the pawl 39 to move the gear 42 the distance of one tooth thereupon. The sector 29 will in turn be moved causing the arm 32 and head 26 carried thereby to move to the next adjacent track 35 upon the tape. By so reciprocating the reel casing a step-by-step movement is given to the head 26 until the latter has passed over each of the tracks 35 upon the tape and after all of the tracks upon this tape have been completely scanned the opposite head 26 may be so employed and the reel casing at the left hand side of the device actuated until all of the sound tracks upon this tape have been scanned thereby permitting relatively long messages to be recorded or reproduced. Only one set of reels 15 are utilized at a time and the other or inoperative reels remain in the position as shown in Figure 10 where they are retained against rotation by being out of contact with the drive disc 20.

To release this mechanism for gradually in a step-by-step manner moving the head 26 from one track to another until all tracks have been scanned, a bevelled plunger 42 for each pawl 39 is provided. These plungers are manually operated by the knobs 43. By pushing downwardly upon a knob 43 its pawl 39 will be moved out of engagement with the teeth of the gear 42 whereupon the head 26 carried by the rod 32 may be free to be moved laterally across the tape through the manipulation of a knob 36.

The electronic amplifier for recording and reproducing is not shown other than in general form or that indicated by the numeral is 44 operable through a button 45 and may take the form of a small box along the design of the so-called "hearing aids" using miniature vacuum tubes and batteries. The microphone and reproducer and indicated by the numeral 46 in Figs. 16 and 17 of the drawings are both constituted of the same electromagnetic piezo-electric or the like reversible element. For erasing the recorded tracks upon the tapes, when desired a conventional oscillator 47 is provided operable manually by means of a single operating knob 48.

Figures 3, 4, 5, 6, 16, 17, 18, 19:
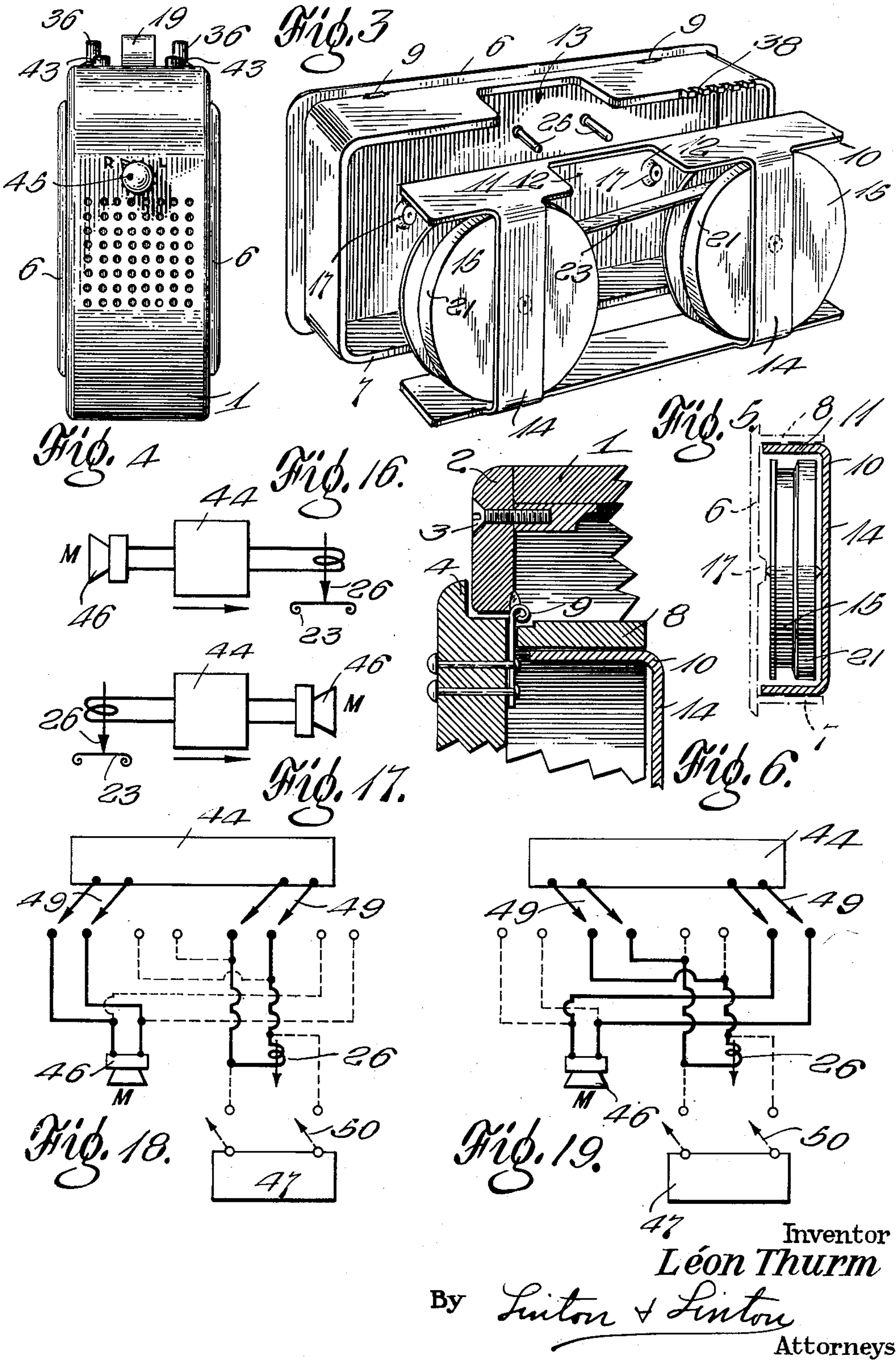
Fig. 3 is another perspective of a simplified showing of one reel bracket removed from its casing.
Fig. 4 is an elevation of the microphone end of the device.
Fig. 5 is a detail sectional view through a reel bracket showing the reel mounting therein.
Fig. 6 is an enlarged detail section of the spring clip for retaining each reel casing to the main body.
Fig. 16 is a schematic showing of the recording path on one tape, from the microphone.
Fig. 17 is a similar showing but of the reproducing path, from the tape to the loudspeaker.
Fig. 18 is a diagram of the device and its electrical circuit, said circuit being in recording and reproducing position on one reel.
Fig. 19 is a similar circuit showing the other reel connected therewith.

In Figs. 18 and 19 the electric circuit shows the amplifier 44 and means 49 for switching the amplifier and element 46 to either of the tapes 23. The oscillator 47 is adapted to be connected by knob 48 through switch 50 directly across the heads 26 when erasing the recordings upon the tapes.

I claim:

1. An electromagnetic sound recorder and reproducer comprising in combination a casing, a driving member rotatably mounted within said casing, removable reel casings insertable within said casing and shiftable therein, a set of tape reels mounted within each of said reel casings, means for selectively connecting said driving member to said reels whereby the tapes thereupon may be caused to travel in opposite directions, reproducing heads shiftable laterally across the tapes of said reels, means for connecting said reel casings to said reproducing heads and means for manually shifting said reel casings whereby said reproducing heads will be caused to be moved laterally across the tapes of said reels.

2. An electromagnetic sound recorder and reproducer comprising in combination a casing, an inertia wheel rotatably mounted within said casing, a portion of said wheel extending from said casing whereby access may be gained thereto for rotating the same, a pair of magnetic tape reels mounted within said casing, means for selectively connecting said wheel to said reels whereby the magnetic tape thereof will be caused to travel in opposite directions and reproducing means engageable with said magnetic tape.

LÉON THURM.

REFERENCES CITED

The following references are of record in the file of this patent:

UNITED STATES PATENTS

| Number | Name | Date |
|---|---|---|
| 2,088,451 | Thomas | July 27, 1937 |
| 2,109,627 | Finch | Mar. 1, 1938 |
| 2,275,961 | Heller | Mar. 10, 1942 |
| 2,402,985 | Caughey | July 2, 1946 |
| 2,408,320 | Kuhlik | Sept. 24, 1946 |
| 2,422,143 | Somers | June 10, 1947 |
| 2,468,198 | Heller | Apr. 26, 1949 |

FOREIGN PATENTS

| Number | Country | Date |
|---|---|---|
| 567,152 | Great Britain | Jan. 31, 1945 |